(12) United States Patent
Iyengar et al.

(10) Patent No.: US 12,454,941 B2
(45) Date of Patent: Oct. 28, 2025

(54) SYSTEMS AND METHODS FOR ESTIMATING FUTURE RISK OF FAILURE OF A WIND TURBINE COMPONENT USING MACHINE LEARNING

(71) Applicant: General Electric Company, Schenectady, NY (US)

(72) Inventors: Satish Giridhar Iyengar, Schenectady, NY (US); Alvaro Enrique Gil, Round Lake, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 446 days.

(21) Appl. No.: 17/876,108

(22) Filed: Jul. 28, 2022

(65) Prior Publication Data
US 2024/0035445 A1 Feb. 1, 2024

(51) Int. Cl.
*F03D 7/04* (2006.01)
*F03D 17/00* (2016.01)

(52) U.S. Cl.
CPC ............. *F03D 7/045* (2013.01); *F03D 7/046* (2013.01); *F03D 17/00* (2016.05); *F05B 2260/80* (2013.01); *F05B 2270/109* (2013.01); *F05B 2270/404* (2013.01)

(58) Field of Classification Search
CPC .......... F03D 7/045; F03D 7/046; F03D 17/00; F05B 2260/80; F05B 2270/109; F05B 2270/404
See application file for complete search history.

(56) References Cited

U.S. PATENT DOCUMENTS

| 8,374,834 B2 | 2/2013 | Bailey et al. |
| 9,923,905 B2* | 3/2018 | Amiri ..................... H04L 67/02 |
| 11,265,688 B2 | 3/2022 | Garrity et al. |
| 2020/0210824 A1* | 7/2020 | Poornaki ............ G05B 23/0221 |

(Continued)

FOREIGN PATENT DOCUMENTS

GB 2440631 A 2/2008

OTHER PUBLICATIONS

European Search Report EP23183667 on Jan. 5, 2024.
(Continued)

*Primary Examiner* — Nathaniel E Wiehe
*Assistant Examiner* — Jason G Davis
(74) *Attorney, Agent, or Firm* — Dority & Manning, P.A.

(57) ABSTRACT

A method for estimating future risk of failure of a component of an industrial asset. The method includes receiving a plurality of different types of data associated with the industrial asset or a fleet of industrial assets. The plurality of different types of data includes, at least, reliability data (such as time-to-event data). The method also includes generating a failure prediction model for the component based on the reliability data and available time-series measurements. Further, the method includes applying the failure prediction model to the different types of data based on the types of data available in the received data. The applied failure prediction model includes one of a default model, a conditional survival model, or a joint conditional survival model. Thus, the method includes estimating, via the failure prediction model, the future risk of failure of the industrial asset and implementing a control action as needed.

18 Claims, 6 Drawing Sheets

(56) References Cited

U.S. PATENT DOCUMENTS

| | | |
|---|---|---|
| 2020/0240875 A1 | 7/2020 | Venkateswaran et al. |
| 2021/0157310 A1 | 5/2021 | Lavid Ben Lulu et al. |
| 2021/0180891 A1 | 6/2021 | Rousseler et al. |
| 2021/0182749 A1* | 6/2021 | Balasubramanian ........................ G06Q 10/0637 |

OTHER PUBLICATIONS

European Search Report EP23183667 on Apr. 18, 2024.
Maziarz et al., On Longitudinal Prediction with Time-to-Event Outcome: Comparison of Modeling Options, Biometrics, vol. 73, No. 1, 2017, 83-93.

* cited by examiner

SYSTEMS AND METHODS FOR ESTIMATING FUTURE RISK OF FAILURE OF A WIND TURBINE COMPONENT USING MACHINE LEARNING

FIELD

The present disclosure relates generally relates to industrial assets, and more particularly, to systems and methods for estimating future risk of failure of a component of an industrial asset, such as a wind turbine, using machine learning and advanced survival analysis techniques.

BACKGROUND

Wind turbines have received increased attention as an environmentally safe and relatively inexpensive alternative energy source. With this growing interest, considerable efforts have been made to develop wind turbines that are reliable and efficient. Generally, a wind turbine includes a plurality of rotor blades coupled via the rotor hub to the main shaft of the turbine. The rotor hub is positioned on top of a tubular tower or base. Utility grade wind turbines (i.e., wind turbines designed to provide electrical power to a utility grid) can have large rotors (e.g., 100 or more meters in diameter). The rotor blades convert wind energy into a rotational torque or force that drives the generator, rotationally coupled to the rotor.

The rate of progression of health/damage of wind turbine components is not only different from asset to asset, but it also changes with time for the same asset depending on its operation. For accurate end-of-life predictions, it is necessary to build a prognostics model that is personalized for each asset. However, it is extremely challenging to build a model that captures all physics of the failure mode propagation. While it may be relatively straightforward to determine a threshold of failure for failure mode such as a crack, it is not so for other failure modes (such as raceway truncation). Further, given the heterogeneity of the input data to known models, it is often the case that an approach that is well suited for one sub-fleet/asset may not work or show optimal performance for another sub-fleet/asset.

Moreover, damage to an asset can manifest itself not only in one, but multiple sensor data. For example, a faulty pitch bearing may cause an increase in motor protection alarms as well as blade angle asymmetry alarms although with different sensitivity levels. Data shows that motor protection alarms are more correlated to pitch bearing failures than blade angle asymmetry alarms. However, it can be challenging to learn this sensitivity factor from data when making pitch bearing failure time predictions.

Accordingly, in some respects, a need exists for methods and systems for accurately estimating future risk of failure of a component of an industrial asset, such as a wind turbine, that addresses the aforementioned issues.

BRIEF DESCRIPTION

Aspects and advantages of the invention will be set forth in part in the following description, or may be obvious from the description, or may be learned through practice of the invention.

In an aspect, the present disclosure is directed to a computer-implemented method for estimating future risk of failure of a component of an industrial asset. The method includes receiving, via a controller, a plurality of different types of data associated with the industrial asset or a fleet of industrial assets. The plurality of different types of data includes, at least, reliability data. The reliability data includes, at least, time-to-event data from the fleet of industrial assets. The method also includes generating, via a controller, a failure prediction model for the component based on the reliability data and available time-series measurements. Further, the method includes applying, via the controller, the failure prediction model to the plurality of different types of data associated with the industrial asset or the fleet of industrial assets based on types of data available in the received plurality of different types of data, the applied failure prediction model including one of a default model, a conditional survival model, or a joint conditional survival model. Moreover, the method includes estimating, via the failure prediction model, the future risk of failure of the industrial asset. In addition, the method includes implementing, via the controller, a control action based on the future risk of failure.

In another aspect, the present disclosure is directed to a system for estimating future risk of failure of a component of a wind turbine. The system includes a controller including at least one processor. The processor(s) is configured to perform a plurality of operations, including but not limited to receiving a plurality of different types of data associated with the industrial asset or a fleet of industrial assets, the plurality of different types of data comprising, at least, reliability data, the reliability data comprising, at least, time-to-event data from the fleet of industrial assets, generating a failure prediction model for the component based on the reliability data and available time-series measurements, applying the failure prediction model to the plurality of different types of data associated with the industrial asset or the fleet of industrial assets based on types of data available in the received plurality of different types of data, the applied failure prediction model comprising one of a conditional survival model or a joint conditional survival model, estimating, via the failure prediction model, the future risk of failure of the industrial asset, and implementing a control action based on the future risk of failure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
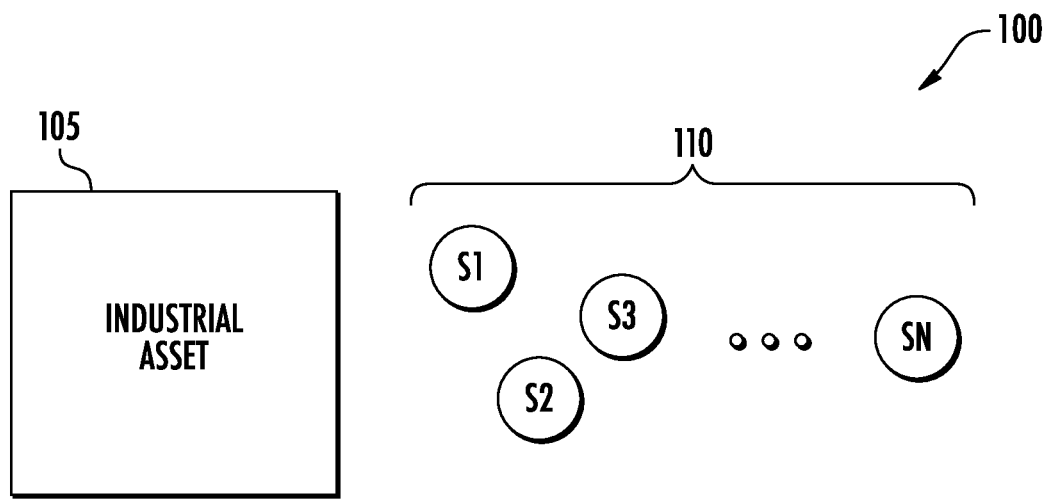
FIG. 1 illustrates a schematic block diagram of an example system having an industrial asset that may be associated with embodiments described herein.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

In general, the present disclosure is directed to systems and methods for estimating future risk of failure (such as end-of-life (EOL) and/or future probability of failure) of wind turbine components using machine learning and/or advanced survival analysis techniques. This is achieved by using multiple and heterogeneous sources of information such as reliability data or both reliability data and time-series measurements. The reliability data may include, for example, time-to-event data or time-to-event data and static data (i.e., data that does not change over time)); whereas time-series measurements may include, for example, data from onboard sensors and features extracted thereof. The time-to-event data may include, for example, historical failures and/or suspensions, and may also be referred to herein as duration data. Thus, in an embodiment, the time-to-event data may include, for example, time/cycles to failure, time/cycles to wear, etc. The static data may include, for example, inspection data (e.g., subjective damage categorization by field engineers), known mitigation actions (e.g., hard and soft) used to extend the life of the component of interest, and/or genealogy information of wind turbines (e.g., turbine type, blade type, rotor diameter, vendor, material type, etc.). The time-series measurements may include, for example, pitch motor current, gearbox oil health, wind speed, power, diagnostic alerts/alarms, etc.

In certain embodiments, the different types of data are collected for monitoring the health of a wind turbine. In particular, in an embodiment, the systems and methods of the present disclosure builds a joint conditional survival model or a conditional survival model based on the type of data available for a sub-fleet to accurately predict the future risk of failure of wind turbine components. Thus, in specific embodiments, the systems and methods of present disclosure can apply the joint conditional survival model when all types of data are available. However, for certain sub-fleets, some information may be missing. For example, such sub-fleets may be prone to a failure mode that is not exhibited in the current sensor measurements. In such cases, the system and method of the present disclosure can automatically switch to the conditional survival model that is more suited than the joint conditional survival model. For the conditional survival model, conditioning may be based on the age of the asset and other covariates, such as turbine genealogy information.

Moreover, in an embodiment, the systems and methods of present disclosure can utilize late-entry measurements. For example, in an embodiment, there may be instances when measurements are not available from the asset start date. Thus, in an embodiment, the systems and methods of present disclosure can switch to a late-entry joint model for such assets. The capability of adapting to different model structures based on the availability and sensitivity of input data to asset life cycle is configured to improve fleet coverage and accuracy.

Further, in an embodiment, the systems and methods of present disclosure can utilize a multivariate model. For example, in an embodiment, damage to an asset can manifest itself not only in one, but multiple sensor data. Thus, in certain embodiments, the systems and methods of present disclosure can utilize a multivariate survival model that integrates time-to-event data with multiple time series measurements.

Referring now to the figures, FIG. 1 illustrates a schematic block diagram of an example system 100 that may be associated with some embodiments herein. More specifically, as shown, the system 100 includes at least one industrial asset 105 having a set of sensors 110 (e.g., Si through SN) associated therewith for monitoring one or more characteristics of the asset 105 (e.g., acceleration, vibration, noise, speed, energy consumed, output power, etc.). Thus, in an embodiment, the information from the sensors 110 may be collected and used to facilitate detection and/or prediction of operation of the industrial asset 105.

Figure 2:
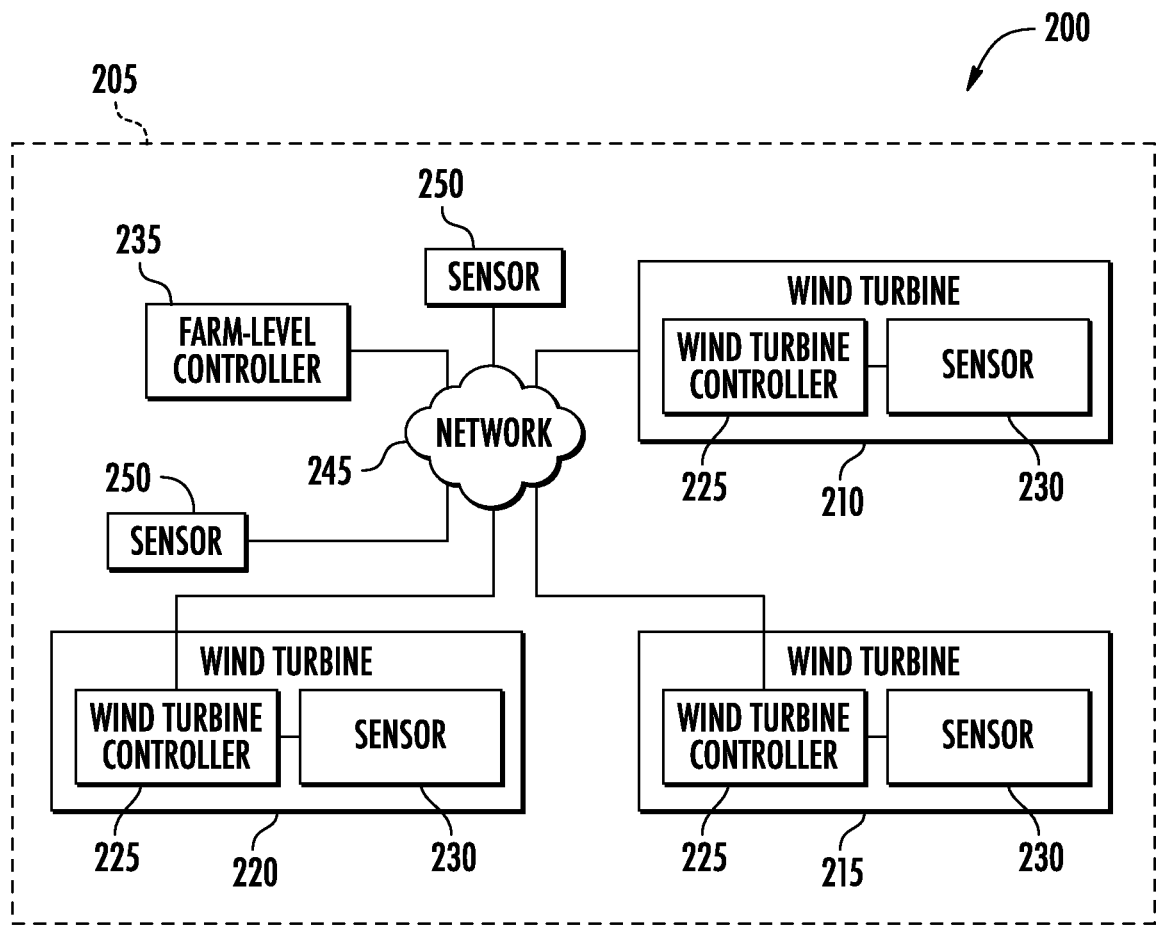
FIG. 2 illustrates a block diagram of a wind farm having a plurality of wind turbines that may be associated with embodiments described herein.

In some aspects, one or more embodiments described herein may be applicable to many different types of industrial assets. By way of example, FIG. 2 illustrates a block diagram of an embodiment of a plurality of wind turbines 210, 215, 220 arranged together in a fleet 200 (e.g., a wind farm 205) that may be monitored to facilitate detection and/or prediction of operation of the various wind turbines 210, 215, 220. Moreover, as shown, the wind turbines 210, 215, and 220 may each include a wind turbine controller 225 that are each in communication with a farm-level controller 235 via a network 245. As an example, network 245 may include, without limitation, the Internet, a local area network (LAN), a wide area network (WAN), a wireless LAN (WLAN), a mesh network, a virtual private network (VPN), and combinations of these and/or other communication network configurations. In some embodiments, the farm-level controller 235 may be located at the wind turbine site or, alternatively, the farm-level controller 235 may be located remotely from wind turbine site.

In further embodiments, the farm-level controller 235 and the wind turbine controllers 225 may include a processor (e.g., a computing device or machine). A processor herein may include, for example, a processing unit, such as, without limitation, an integrated circuit (IC), an application specific integrated circuit (ASIC), a microcomputer, a programmable logic controller (PLC), and/or any other programmable circuit. A processor herein may include multiple processing units (e.g., in a multi-core configuration). In some embodiments, the farm-level controller 235 and the wind turbine controllers 225 may be configurable to perform the operations described herein by programming the corresponding processor. For example, a processor may be programmed by encoding an operation as one or more executable instructions and providing the executable instructions to the processor as a data structure stored in a memory device coupled to the processor. A memory device may include, without limitation, one or more random access memory (RAM) devices, one or more storage devices, and/or one or more computer-readable media.

As depicted in the example of FIG. 2, one or more operating condition sensors 230 and 250 may be coupled in communication with farm-level controller 235 and/or wind turbine controllers 225 (e.g., via the network 245). Operating condition sensors 230 may be configured to indicate an operating condition, such as a meteorological condition at a corresponding geographic position in the vicinity of one or more of the wind turbines at site. Further, in an embodiment, operating condition sensors 250 may be configured to indicate a wind speed, a wind direction, a temperature, etc. Operating condition sensor 250 may be positioned apart from wind turbines 210, 215, and 220 to facilitate reducing interference from the wind turbines with the operating condition sensed by operating condition sensor 250.

Figure 3:
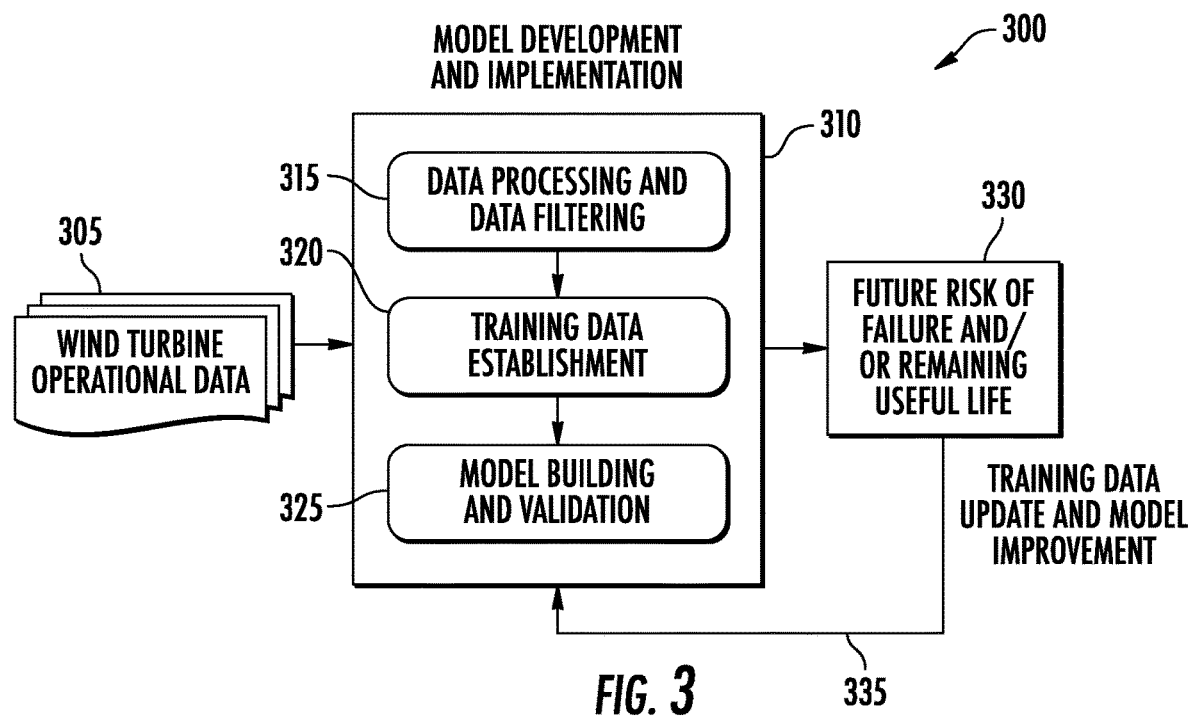
FIG. 3 illustrates a block diagram of an overall example system in accordance with embodiments described herein.

Referring now to FIG. 3, a schematic block diagram depicting an overall system 300, in accordance with some embodiments is illustrated. As shown, the system 300 illustrates wind turbine operational data 305 being provided as input(s) to a model development and implementation system 310, device, service, or apparatus (also referred to herein simply as a "system" or "service") that outputs, at least, data 330 indicative of future risk of failure (e.g., remaining useful life and/or future probability of failure) determined by the model system 310.

In the example of FIG. 3, the model system 310 includes a data processing and data filtering component 315, a training data establishment component 320, and a model building and validation component 325. Functionality corresponding to each of these components (described below) may be embodied in separate systems, subsystems, services, and devices. Alternatively, one or more of the different functionalities may be provided by a same system, subsystem, device, and service (i.e., a cloud-based service supported by a backend system including processing and database resources).

In some embodiments, the data processing and data filtering component 315 may process, condition, pre-process, or "clean" the operational data 305 such that the data is configured in an expected manner and format for efficient processing by the model system 310. In some scenarios, the operational data 305 may include historical operational data associated with one or more wind turbines 210, 215, 220. Further, in an embodiment, the operational data 305 may be received directly or indirectly from the wind turbines 210, 215, 220, such as a database storing the data and/or a service provider that may aggregate or otherwise collect the operational data. For example, the data processing and data filtering component 315 may operate to exclude turbine downtime data received in the operational data 305 since such data may not be needed in some embodiments herein. In some aspects, data processing may be performed to ensure data quality and data validity, such as, for example, to process the operational data 305 to execute an air density correction for wind speed measurements included in the operational data 305. Thus, in particular embodiments, the data processing and data filtering component 315 may perform a quality check on the historical time-to-event data to evaluate the historical time-to-event data for errors and may thus correct the errors found during the quality check to obtain a resultant time-to-event data set.

The training data establishment component 320 or functionality of the model system 310 may operate to establish a set of training cases based on the historical diagnostic records of the operational data 305. The set of training cases may be used in training the model generated by the model building and validation component 325. In some embodiments, multiple pairs of time series of sensor measurements are selected for each training cases. It is noted that normal turbine operation cases may also be included in the training data set, and may be used to, for example, provide a relative operational baseline for the wind turbines represented in the operational data 305. In some embodiments, the operational data 305 may be reviewed by domain experts and/or automated processing systems that can, for example, reference digitized or other machine readable data structures and systems, devices, and services that embody a domain expert knowledgebase to ensure correct labeling of training cases.

The output of the model system 310 may be used for updating training data and model improvement. For example, in an embodiment, as shown, a feedback loop 335 may be configured to track an accuracy of the model. In such embodiments, newly identified data can be added into the original training set (e.g., a subset of the historical operational data used to develop the model), and an updated model can be re-tuned to capture the new expanded distribution of training cases. In this manner, a functionality or process can be provided that facilitates a continuous updating of training data for the model, as well as model improvement.

Figure 4:
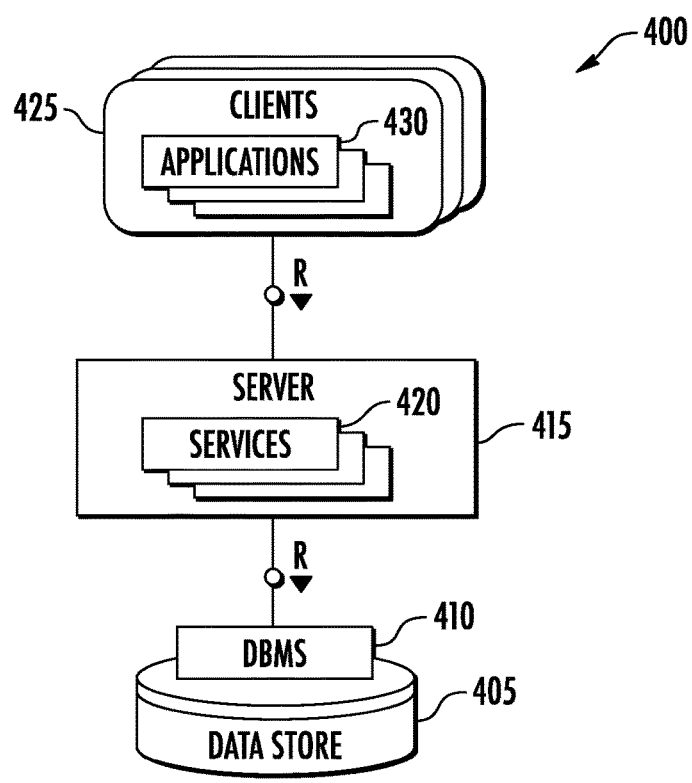
FIG. 4 illustrates an illustrative system architecture in accordance with embodiments described herein.

Referring now to FIG. 4, a schematic diagram of an embodiment of a system 400 in accordance with the present disclosure is illustrated. It should be appreciated that the embodiments herein are not limited to the configuration of the system 400 of FIG. 4, and FIG. 4 is shown for purposes of example. In an embodiment, the model disclosed herein may be implemented by system 400. In particular, as shown, the system 400 includes a data store 405, a database management system (DBMS) 410, a cloud server 415, one or more services 420, one or more clients 425, and one or more applications 430. Generally, the service(s) 420 executing within the cloud server 415 receive requests from application(s) 430 executing on client(s) 425 and provides results to the application(s) 430 based on data stored within the data store 405. For example, the cloud server 415 may execute and provide the service(s) 420 to the application(s) 430.

In a non-limiting example, the client 425 may execute one or more of the applications 430 via a user interface displayed on the client 425 to view analytical information such as visualizations (e.g., charts, graphs, tables, and the like), based on the underlying data (e.g., the operational data 305) stored in the data store 405. The applications 430 may pass analytic information to one of services 420 (e.g., a model development and implementation service such as, for example, system 310 in FIG. 3) based on input received via the client 425. Thus, according to various embodiments, one or more of the applications 430 and the cloud services 420 may be configured to perform future risk of failure (e.g., remaining useful life and/or future probability of failure) using the model developed in accordance with some embodiments herein.

In some embodiments, the data of data store 405 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 405 may support multi-tenancy to separately support multiple unrelated clients by providing multiple logical database systems which are programmatically isolated from one another. Furthermore, data store 405 may support multiple users that are associated with the same client and that share access to common database files stored in the data store 405.

Referring now to FIGS. 5-9, a goal of the present disclosure is to build a prognostics model that processes all information available for an industrial asset up until its current time and predicts its future risk of failure, i.e., the remaining useful life (RUL) and/or the future probability of failure. As mentioned, the rate of progression of health/damage is not only different from asset to asset, but it also changes with time for the same asset depending on its operation. Thus, to provide accurate end-of-life predictions, the present disclosure builds a prognostics model that is personalized for each asset.

Further, as mentioned, it can be challenging to build a model that captures all physics of the failure mode propagation. While it may be relatively straightforward to determine a threshold of failure for failure mode such as a crack, it is not so for other failure modes, such as raceway truncation. Thus, the present disclosure overcomes both these challenges by directly regressing time-to-failure (output variable) over several static and dynamic covariates. In order, to capture asset/turbine specific profiles, a random effects model can be used to characterize sensor measurements and their evolution over time.

Given the heterogeneity of the input data, it is often the case that an approach that is well suited for one sub-fleet/asset may not work or show optimal performance for another sub-fleet/asset. Accordingly, the present disclosure includes a library of models, and a model selection block that automatically diverts the input data to the suitable model depending on the availability and sensitivity of input data profile to asset life. Further, in an embodiment, separate models can be built for each failure mode and predictions can be combined using a competing risk model to generate the final time-to-failure distribution.

Furthermore, damage to an asset can manifest itself not only in one but multiple sensor data. For example, a faulty pitch bearing causes an increase in motor protection alarms as well as blade angle asymmetry alarms although with different sensitivity levels. In certain instances, data shows that motor protection alarms are more correlated to pitch bearing failures than blade angle asymmetry alarms. Thus, the present disclosure can also learn such sensitivity factors from the data when making predictions.

Figure 5:
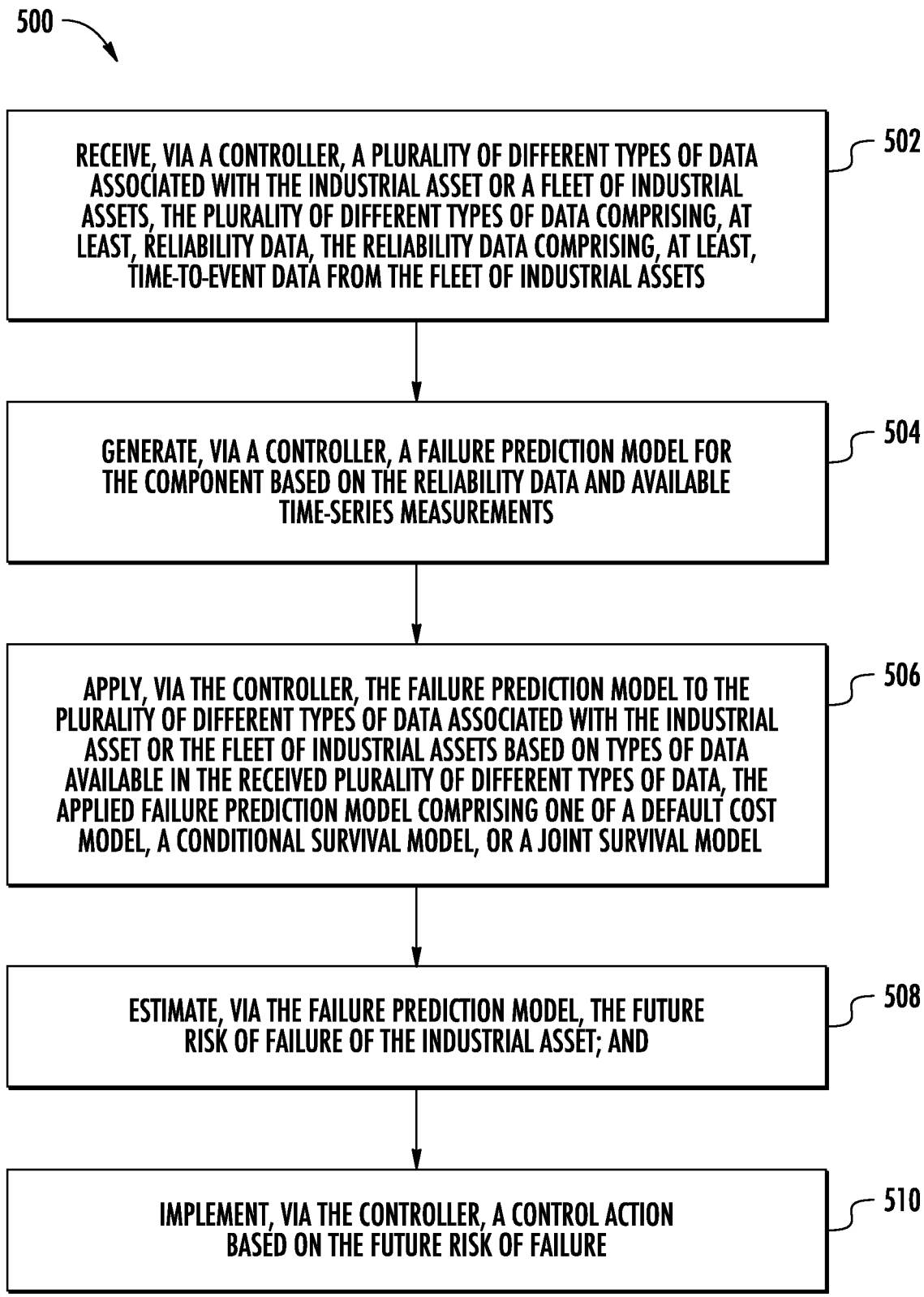
FIG. 5 illustrates a flow diagram of an embodiment of a method for estimating future risk of failure of a component of an industrial asset according to the present disclosure.

Referring particularly to FIG. 5, a flow diagram of an illustrative method 500 for estimating future risk of failure of a component of an industrial asset, such as any of the wind turbines 210, 215, 220, in accordance with some embodiments of the present disclosure is illustrated. The flow diagrams and methods described herein do not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

As shown at (502), the method 500 includes receiving, via a controller, a plurality of different types of data associated with the industrial asset or a fleet of industrial assets. As mentioned, the plurality of different types of data may include reliability data or both reliability data and time-series measurements. The reliability data may include, for example, static data or both static data and time-to-event data from the fleet of industrial assets.

As shown at (504), the method 500 includes generating, via the controller, a failure prediction model for the component based on the reliability data and available time-series measurements (and features extracted thereof). As shown at (506), the method 500 includes applying, via the controller, the failure prediction model to the plurality of different types of data associated with the industrial asset or the fleet of industrial assets based on types of data available in the received plurality of different types of data. For example, in an embodiment, the applied failure prediction model may be selected from a default model, a conditional survival model, or a joint conditional survival model as described herein below.

As shown at (508), the method 500 includes estimating, via the failure prediction model, the future risk of failure of the industrial asset. As shown at (510), the method 500 includes implementing, via the controller, a control action based on the future risk of failure. For example, in an embodiment, implementing the control action may include scheduling a preventative maintenance action, scheduling a repair action, generating an alarm, shutting down the industrial asset, shutting down the component of the industrial asset, or performing a sensitivity analysis.

Figure 6:
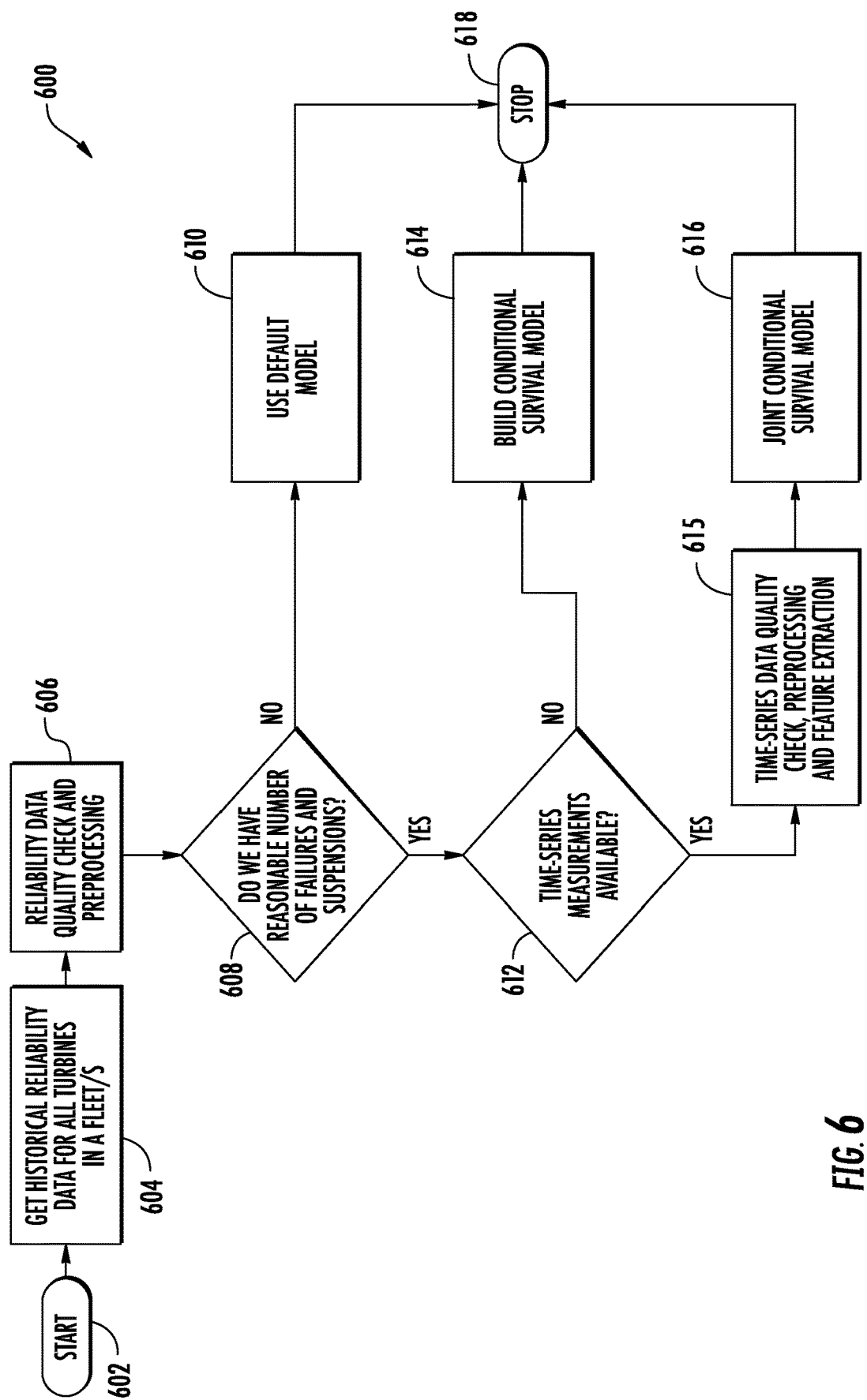
FIG. 6 illustrates a flow diagram of an embodiment of a process for developing a failure prediction model for estimating future risk of failure of a component of an industrial asset according to the present disclosure.

The method 500 of FIG. 5 can be better understood with reference to FIGS. 6-9. In particular, FIG. 6 illustrates a flow diagram of an embodiment of a process 600 for building the failure prediction model according to the present disclosure. In particular, the failure prediction model(s) can be built at the 'fleet' level, wherein each fleet has wind turbines with a common turbine platform, blade type, asset vendor, etc. More specifically, as shown at (602), the process 600 begins. As shown at (604), the process 600 includes obtaining historical reliability data for all assets in the fleet. For example, in an embodiment, the reliability data may include a start date/installation of the industrial asset, a current status of the industrial asset, (e.g., whether the asset has failed, or is operational but running with wear or is operational and healthy, etc.), genealogy information relating to the industrial asset, inspection data/notes associated with wear or damage of the industrial asset. In such embodiments, the current status of the industrial asset comprising at least one of a failure status, an operational status, a wear status, or combinations thereof.

Still referring to FIG. 6, as shown at (606), the process 600 further includes performing data quality checks and/or correcting data for any errors during data entry. As shown at (608), the process 600 includes evaluating whether the resultant data, after preprocessing and data quality checks, has a reasonable number of historical failures and/or suspensions. For example, in such embodiments, the process 600 may include determining a number of historical failures/suspensions present in the resultant reliability data set and comparing the number of historical failures/suspensions to a threshold.

Thus, as shown at (610), if the resultant data, after preprocessing and data quality checks, have zero or very few historical failures/suspensions (i.e., the number of historical failures/suspensions is below the threshold), the process 600 includes using a default model that approximates lower order physics (e.g., Paris law for crack propagation) or a data-driven conditional WeiBayes-type models.

In contrast, as shown at (612), if there are enough number of historical failures and/or suspensions, the process 600 continues by collecting relevant time-series measurements, if available. In an embodiment, as shown at (615), the process includes performing a time-series data quality check, preprocessing, and feature extraction. In addition, in particular embodiments, the process 600 includes determining which time-series measurements are relevant to the asset's failure mode for all turbines of in the given fleet. This is done by consulting subject matter experts and/or by correlating time-series measurements with historical time-to-event data. When time-series measurements is unavailable or when it has zero correlation with time-to-event data, as shown at (614), the process 600 includes building conditional survival models based only on time-to-event data and available static data.

Alternatively, if time-series measurements (or features extracted thereof) are correlated to time-to-event data, as shown at (616) of FIG. 6, the process 600 includes building one or more joint conditional survival model(s). In particular, in an embodiment, when the number of historical failures/suspensions is above the threshold and the time-series measurements associated with the industrial asset is available, the process 600 may include determining which of the time-series measurements associated with the industrial asset are relevant to a failure mode for each of the industrial assets in the fleet by correlating the time-series measurements with the historical time-to-event data and then generating the joint conditional survival model 616 based on the failure mode for each of the industrial assets in the fleet.

Accordingly, in an embodiment, multiple models with different association structures and time-series models can be built and the one with best predictive accuracy is selected as the preferred model that will then be used to compute future survival predictions for all online turbines in the fleet. More specifically, in an embodiment, when the number of historical failures/suspensions is above the threshold and the time-series data associated with the industrial asset is available, the process 600 may include generating a plurality of models with different association structures and selecting one of the plurality of models based on an accuracy thereof as a preferred model. In such embodiments, as an example, the preferred model may be the joint conditional survival model.

For all of the survival models, the time-to-failure response variable can either be an asset's age in calendar time or can be in other relevant engineering units (e.g., pitch travel, cycles, MWh, etc.). In certain embodiments, the choice of the output variable may be driven by subject matter experts and how correlated such variables are to the age of the asset. Model building then ends as shown at (618).

Figure 7:
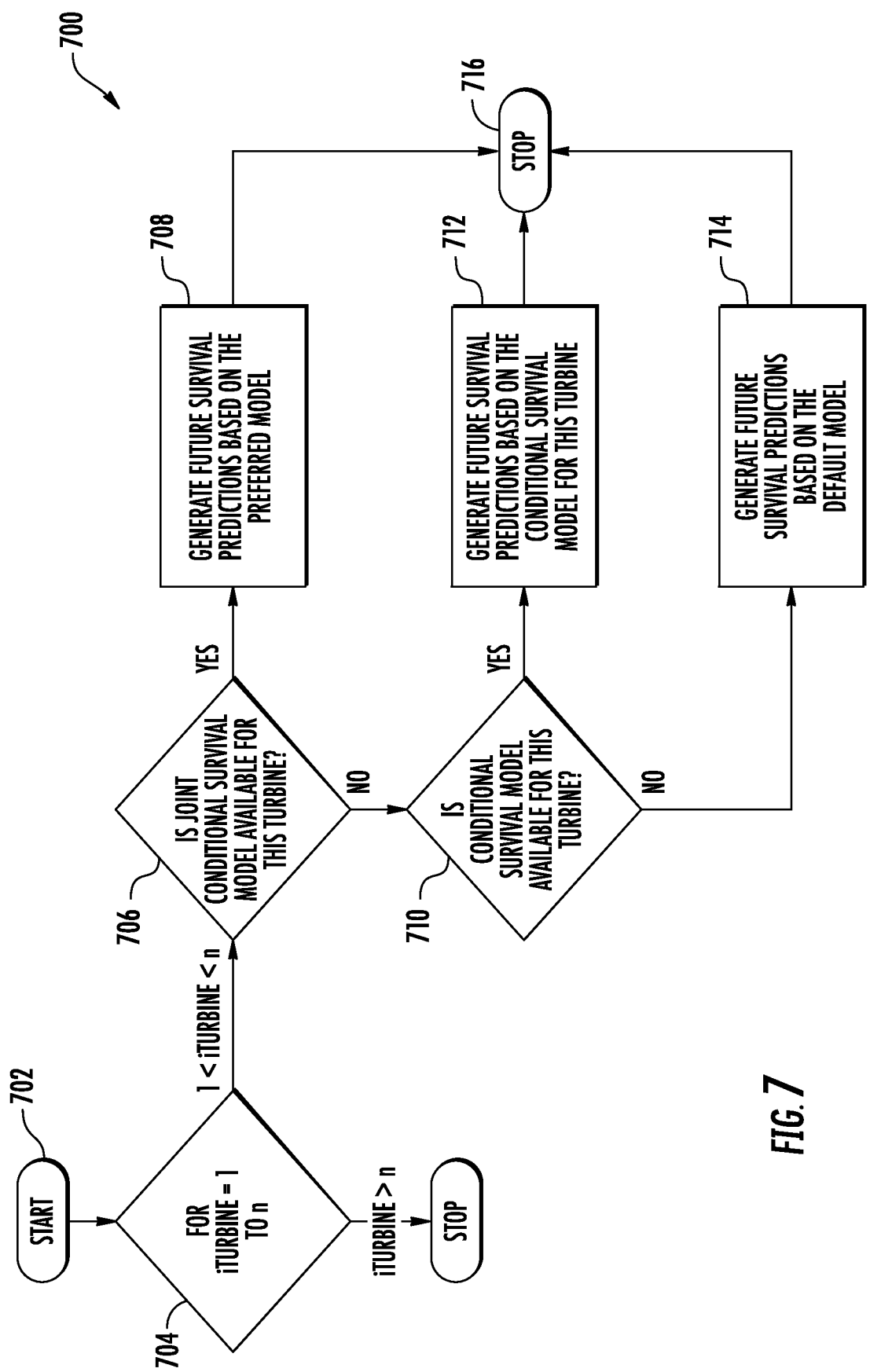
FIG. 7 illustrates a flow diagram of an embodiment of a process for employing the failure prediction model developed in FIG. 6.

Referring particularly to FIG. 7, a flow diagram of an embodiment of a process 700 for using the developed models from FIG. 6 to make end-of-life predictions for wind turbine components according to the present disclosure. In particular, the application of the model to generate future survival predictions begins at (702). As shown at (704), the process 700 includes collecting reliability data or both reliability data and time-series measurements for each online turbine (e.g., for iTurbine=1 to n). As shown at (706), the process 700 includes determining whether the joint conditional survival model(s) 616 is available for the particular wind turbine. If so, as shown at (708), the process 700 includes generating future survival predictions using the preferred model. More specifically, in an embodiment, the process 700 may include applying the preferred model to the turbines' data to get predictions (e.g., the future risk of failure). The process 700 then ends as shown at 716.

Alternatively, as shown at (710), if the preferred model is unavailable for a particular wind turbine, the process 700 includes determining whether a conditional survival model is available for the turbine of interest. If yes, as shown at (712), the process 700 includes generating future survival predictions based on the conditional survival model for the turbine of interest. The process 700 then ends as shown at 716. Alternatively, if the conditional survival model is unavailable for the turbine of interest, as shown at (714), the process 700 includes generating future survival predictions using the default model. The process 700 then ends as shown at 716.

The predictions from the various models described herein can then be used for asset management. In particular, the output of the prognostic models can be used to plan the maintenance of assets. For example, assets that are prone to fail sooner can be prioritized in the schedule, whereas assets who are to survive for a long time can be assigned a low priority. If there are covariates that provide information about the number of maintenance tasks and when they were performed, a sensitivity analysis can also be performed to observe how the RUL and failure probability estimates change if an additional maintenance is performed. This simulation can be run for different potential maintenance dates. The maintenance date that prolongs the life of the component the most can then be selected. The same sensitivity analysis can be done using multiple maintenance dates to decide when each one should be conducted. Further, output of prognostics models can be merged with cost data to perform cost/benefit analysis and generate a priority list that directly optimizes business value. Moreover, in an embodiment, the models described herein can be updated if new failures and/or suspensions become available. In such embodiments, the failure prediction model described herein can be trained with additional failure data after generating the failure prediction model for the component based on historical reliability data from the fleet of the industrial assets and the availability of the time-series data associated with the industrial asset of the fleet.

Thus, in an embodiment, the prognostic models of the present disclosure can be used to plan the replacements and/or repairs that are needed in the future. An optimization algorithm can also be used to schedule the equipment, parts, tools, and personnel that are needed for these tasks. For example, the maintenance plan can indicate the sequence in which the wind turbines will be visited, and which components need to be repaired/replaced. In an embodiment, since the plan can result in the repair/replacement of multiple components within a turbine, bundling repair/replacement tasks and avoiding multiple crane mobilization costs to the same site can be realized.

Moreover, in an embodiment, future survival probabilities of different wind turbine components can be merged with vendor-specific lead times for procuring parts to accurately forecast demand for these parts. In such embodiments, the quantity of parts to order as well as when to order these parts are known so that contract service level guarantees can be met. This avoids over-ordering and under-ordering of parts.

In further embodiments, the predictions of the prognostic models are embedded into the controller strategy in order to extend the life of the components in a wind turbine. Advanced notice on the future survival probability of assets allows to plan turbine servicing tasks in safer low wind seasons.

It should further be understood that the systems and methods described herein generally described prognostic models for a component of interest. However, there are multiple components in a turbine, which will result in a set of prognostic models. Furthermore, each component may have multiple failure modes which may further result in a prognostic model for each failure mode. Therefore, the occurrence of a failure in one component may prevent observance of other types of component failures. Similarly, the occurrence of one type of failure mode within a component may also prevent observance of other component failures. Either scenario leads to competing risks that can be accounted in the present disclosure by developing competing risk models using the methods discussed above.

In further embodiments, the predictive accuracy of the models described herein can be estimated by focusing on a time interval within which predicting the occurrence of event is of interest. This interval can differ depending on the application. For example, to take maintenance actions such as whether one should grease a bearing or not, short-term forecasts (e.g., 30-90 days from the current date) may be needed. However, if the application is to estimate how many parts to order, a more advanced notice (e.g., semi-annual, or annual forecasts) may be needed. It is, therefore, important to test if the model can successfully discriminate between assets that are going to fail from those which will not fail within a specific time interval. To do this, receiver operating characteristic (ROC) curves can be generated that plot the trade-off between the catch rate and false alarm rate for multiple time intervals.

Figure 8:
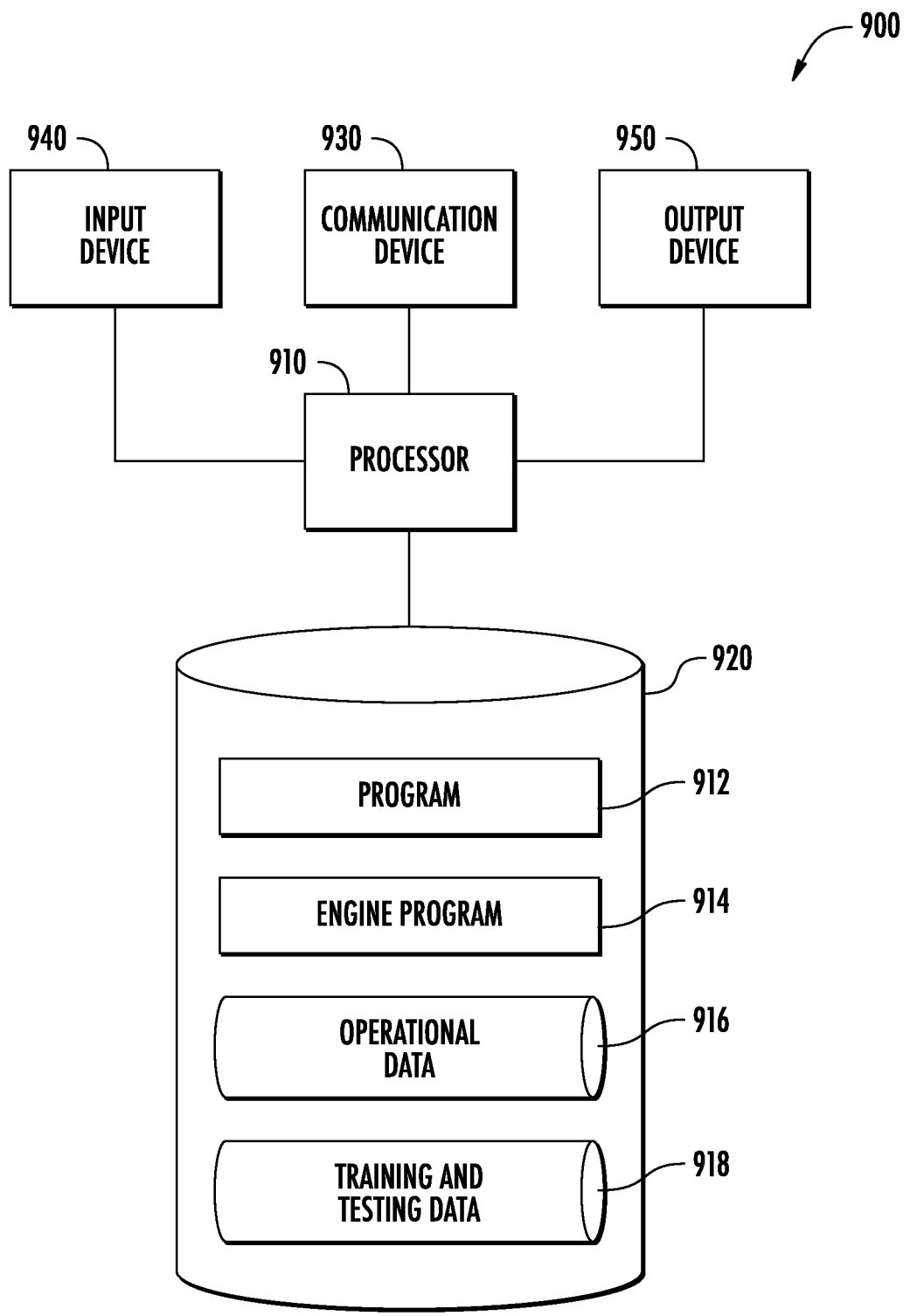
FIG. 8 illustrates an apparatus that may be provided in accordance with embodiments described herein.

The embodiments described herein may be implemented using any number of different hardware configurations. For example, FIG. 8 illustrates an apparatus 900 that may be, for example, associated with the systems and architectures depicted in FIGS. 1-8. As shown, the apparatus 900 includes a processor 910, such as one or more commercially available Central Processing Units (CPUs) in the form of one-chip microprocessors, coupled to a communication device 930 configured to communicate via a communication network (not shown in FIG. 8). Further, as shown, the apparatus 900 further includes an input device 940 (e.g., a mouse and/or keyboard to enter information about industrial asset operation and anomalies) and an output device 950 (e.g., a computer monitor to output warning and reports).

Moreover, in an embodiment, the processor 910 can also communicate with a storage device 920. The storage device 920 may include any appropriate information storage device, including combinations of magnetic storage devices (e.g., a hard disk drive), optical storage devices, mobile telephones, and/or semiconductor memory devices. Further, as shown, the storage device 920 may store a program 912 and/or an engine program 914 (e.g., associated with a model development and tuning process) for controlling the processor 910. As shown in FIG. 8, the storage device 920 may also store operational data 916 and training and testing data 918 associated with the wind turbines. Thus, in an embodiment, the processor 910 performs instructions of the programs 912, 914, and thereby operates in accordance with any of the embodiments described herein. For example, the processor 910 may receive sensor data associated with operation of an industrial asset, the sensor data including values for a plurality of sensors over a period of time. An output of the model may include future risk of failure (e.g., remaining useful life of the component and/or a probability of failure). The generated model may then be executed to automatically predict future risk of failure of the component.

The programs 912, 914 may be stored in a compressed, uncompiled and/or encrypted format. The programs 912, 914 may furthermore include other program elements, such as an operating system, a database management system, and/or device drivers used by the processor 910 to interface with peripheral devices.

While only certain features of the invention have been illustrated and described herein, many modifications and changes will occur to those skilled in the art. It is, therefore, to be understood that the appended claims are intended to cover all such modifications and changes as fall within the true spirit of the invention.

Further aspects of the invention are provided by the subject matter of the following clauses:

Clause 1. A computer-implemented method for estimating future risk of failure of a component of an industrial asset, the method comprising:
receiving, via a controller, a plurality of different types of data associated with the industrial asset or a fleet of industrial assets, the plurality of different types of data comprising, at least, reliability data, the reliability data comprising, at least, time-to-event data from the fleet of industrial assets;
generating, via a controller, a failure prediction model for the component based on the reliability data and available time-series measurements;
applying, via the controller, the failure prediction model to the plurality of different types of data associated with the industrial asset or the fleet of industrial assets based on types of data available in the received plurality of different types of data, the applied failure prediction model comprising one of a default model, a conditional survival model, or a joint conditional survival model;
estimating, via the failure prediction model, the future risk of failure of the industrial asset; and
implementing, via the controller, a control action based on the future risk of failure.

Clause 2. The computer-implemented method of clause 1, wherein the time-to-event data comprises at least one of a number of historical failures, a number of historical suspensions, time/cycles to failure, time/cycles to wear, or combinations thereof.

Clause 3. The computer-implemented method of any of the preceding clauses, wherein the time-series measurements comprises data from one or more sensors of the industrial asset.

Clause 4. The computer-implemented method of clause 2, further comprising:
performing a quality check on at least one of the reliability data or the time-series measurements to evaluate for errors; and
correcting the errors found during the quality check.

Clause 5. The computer-implemented method of clause 4, further comprising:
  determining the number of failures or the number of suspensions present in the time-to-event data; and
  comparing the number of failures or the number of suspensions to a threshold.

Clause 6. The computer-implemented method of clause 5, wherein generating the failure prediction model for the component based on the reliability data and the availability of the time-series measurements further comprises: using the default model as the failure prediction model when the number of historical failures or the number of suspensions is below the threshold.

Clause 7. The computer-implemented method of clause 6, wherein the default model comprises at least one of one or more physics-based models or one or more WeiBayes-type models.

Clause 8. The computer-implemented method of clause 5, wherein generating the failure prediction model for the component based on the reliability data and the available time-series measurements further comprises:
  when the number of historical failures or the number of suspensions is above the threshold, determining whether the time-series measurements associated with the industrial asset are available, and if so, building the failure prediction model using the reliability data and the time-series measurements associated with the industrial asset.

Clause 9. The computer-implemented method of clause 8, wherein generating the failure prediction model for the component based on the reliability data and the available time-series measurements further comprises:
  when the number of historical failures or the number of suspensions is above the threshold and the time-series measurements associated with the industrial asset is available, generating a plurality of models with different association structures; selecting one of the plurality of models based on an accuracy thereof as a preferred model, the preferred model being the failure prediction model, which is the joint conditional survival model.

Clause 10. The computer-implemented method of clause 9, wherein the joint conditional survival model comprises a time-series model that characterizes a time evolution of the time-series measurements, a survival model that uses the reliability data, and an association structure comprising parameters to join the time-series model and the survival model together based on the reliability data.

Clause 11. The computer-implemented method of clause 10, wherein the reliability data further comprises static data, the static data comprising at least one of a start date of the industrial asset, a current status of the industrial asset, mitigation actions implemented to extend a life of the component of industrial asset, genealogy information relating to the industrial asset, inspection data associated with wear of the industrial asset, a current status of the industrial asset comprising at least one of a failure status, an operational status, a wear status, or combinations thereof.

Clause 12. The computer-implemented method of clause 9, wherein generating the failure prediction model for the component based on the reliability data and the available time-series measurements further comprises:
  when the number of historical failures or the number of suspensions is above the threshold and the time-series measurements associated with the industrial asset is available, determining which of the time-series measurements associated with the industrial asset are relevant to a failure mode for each of the industrial assets in the fleet by correlating the time-series measurements with the time-to-event data; and generating the joint conditional survival model based on the failure mode for each of the industrial assets in the fleet.

Clause 13. The computer-implemented method of clause 12, wherein estimating the future risk of failure of the industrial asset further comprises:
  estimating the future risk of failure of the industrial asset using the joint conditional survival model.

Clause 14. The computer-implemented method of clause 11, wherein generating the failure prediction model for the component based on the reliability data and the available time-series measurements further comprises:
  when the number of historical failures or the number of suspensions is above the threshold, determining whether the time-series measurements associated with the industrial asset is available, and if not, building the conditional survival model using the reliability data, the conditional survival model being the failure prediction model.

Clause 15. The computer-implemented method of clause 14, wherein estimating the future risk of failure of the industrial asset further comprises:
  estimating the future risk of failure of the industrial asset using the conditional survival model.

Clause 16. The computer-implemented method of any of the preceding clauses, further comprising training the failure prediction model with additional failure data after generating the failure prediction model for the component.

Clause 17. The computer-implemented method of any of the preceding clauses, further comprising developing one or more competing risk models for evaluating the future risk of failure of the industrial asset.

Clause 18. The computer-implemented method of any of the preceding clauses, wherein implementing the control action comprises at least one of scheduling a preventative maintenance action, scheduling a repair action, performing asset management actions, generating an alarm, shutting down the industrial asset, shutting down the component of the industrial asset, or performing a sensitivity analysis.

Clause 19. The computer-implemented method of any of the preceding clauses, wherein the industrial asset comprises a wind turbine.

Clause 20. A system for estimating future risk of failure of a component of a wind turbine, the system comprising:
  a controller comprising at least one processor, the at least one processor configured to perform a plurality of operations, the plurality of operations comprising:
    receiving a plurality of different types of data associated with the wind turbine or a fleet of wind turbines, the plurality of different types of data comprising, at least, reliability data, the reliability data comprising, at least, time-to-event data from the fleet of wind turbines;
    generating a failure prediction model for the component based on the reliability data and available time-series measurements;
    applying the failure prediction model to the plurality of different types of data associated with the wind turbine or the fleet of wind turbines based on types of data available in the received plurality of different types of data, the applied failure prediction model comprising one of a conditional survival model or a joint conditional survival model;
    estimating, via the failure prediction model, the future risk of failure of the wind turbine; and implementing a control action based on the future risk of failure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for estimating future risk of failure of a component of an industrial asset, the method comprising:
   receiving, via a controller, a plurality of different types of data associated with the industrial asset or a fleet of industrial assets, the plurality of different types of data comprising, at least, reliability data, the reliability data comprising, at least, time-to-event data from the industrial asset or the fleet of industrial assets;
   determining a number of failures or a number of suspensions present in the time-to-event data;
   comparing the number of failures or the number of suspensions to a threshold;
   generating, via the controller, a failure prediction model for the component based on the reliability data and available time-series measurements;
   applying, via the controller, the failure prediction model to the plurality of different types of data associated with the industrial asset or the fleet of industrial assets based on types of data available in the received plurality of different types of data, the applied failure prediction model comprising one of a default model, a conditional survival model, or a joint conditional survival model;
   using the default model as the failure prediction model when the number of failures or the number of suspensions is below the threshold;
   estimating, via the failure prediction model, the future risk of failure of the industrial asset; and
   implementing, via the controller, a control action based on the future risk of failure, wherein implementing the control action comprises at least one of shutting down the industrial asset or shutting down the component of the industrial asset.

2. The computer-implemented method of claim 1, wherein the time-to-event data comprises the number of failures, the number of suspensions, and at least one of a number of historical failures, a number of historical suspensions, time/cycles to failure, time/cycles to wear, or combinations thereof.

3. The computer-implemented method of claim 2, further comprising:
   performing a quality check on at least one of the reliability data or the time-series measurements to evaluate for errors; and
   correcting the errors found during the quality check.

4. The computer-implemented method of claim 1, wherein the default model comprises at least one of one or more physics-based models or one or more WeiBayes-type models.

5. The computer-implemented method of claim 1, wherein generating the failure prediction model for the component based on the reliability data and the available time-series measurements further comprises:
   when the number of historical failures or the number of suspensions is above the threshold, determining whether the time-series measurements associated with the industrial asset are available, and if so,
   building the failure prediction model using the reliability data and the time-series measurements associated with the industrial asset.

6. The computer-implemented method of claim 5, wherein generating the failure prediction model for the component based on the reliability data and the available time-series measurements further comprises:
   when the number of historical failures or the number of suspensions is above the threshold and the time-series measurements associated with the industrial asset is available, generating a plurality of models with different association structures;
   selecting one of the plurality of models based on an accuracy thereof as a preferred model, the preferred model being the failure prediction model, which is the joint conditional survival model.

7. The computer-implemented method of claim 6, wherein the joint conditional survival model comprises a time-series model that characterizes a time evolution of the time-series measurements, a survival model that uses the reliability data, and an association structure comprising parameters to join the time-series model and the survival model together based on the reliability data.

8. The computer-implemented method of claim 7, wherein the reliability data further comprises static data, the static data comprising at least one of a start date of the industrial asset, a current status of the industrial asset, mitigation actions implemented to extend a life of the component of industrial asset, genealogy information relating to the industrial asset, inspection data associated with wear of the industrial asset, a current status of the industrial asset comprising at least one of a failure status, an operational status, a wear status, or combinations thereof.

9. The computer-implemented method of claim 8, wherein generating the failure prediction model for the component based on the reliability data and the available time-series measurements further comprises:
   when the number of historical failures or the number of suspensions is above the threshold, determining whether the time-series measurements associated with the industrial asset is available, and if not,
   building the conditional survival model using the reliability data, the conditional survival model being the failure prediction model.

10. The computer-implemented method of claim 9, wherein estimating the future risk of failure of the industrial asset further comprises:
    estimating the future risk of failure of the industrial asset using the conditional survival model.

11. The computer-implemented method of claim 6, wherein generating the failure prediction model for the component based on the reliability data and the available time-series measurements further comprises:
    when the number of historical failures or the number of suspensions is above the threshold and the time-series measurements associated with the industrial asset is available, determining which of the time-series measurements associated with the industrial asset are relevant to a failure mode for each of the industrial assets in the fleet by correlating the time-series measurements with the time-to-event data; and generating the joint conditional survival model based on the failure mode for each of the industrial assets in the fleet.

12. The computer-implemented method of claim 11, wherein estimating the future risk of failure of the industrial asset further comprises:
estimating the future risk of failure of the industrial asset using the joint conditional survival model.

13. The computer-implemented method of claim 1, wherein the time-series measurements comprises data from one or more sensors of the industrial asset.

14. The computer-implemented method of claim 1, further comprising training the failure prediction model with additional failure data after generating the failure prediction model for the component.

15. The computer-implemented method of claim 1, further comprising developing one or more competing risk models for evaluating the future risk of failure of the industrial asset.

16. The computer-implemented method of claim 1, wherein implementing the control action further comprises at least one of scheduling a preventative maintenance action, scheduling a repair action, performing asset management actions, generating an alarm, or performing a sensitivity analysis.

17. The computer-implemented method of claim 1, wherein the industrial asset comprises a wind turbine.

18. A system for estimating future risk of failure of a component of a wind turbine, the system comprising:
a controller comprising at least one processor, the at least one processor configured to perform a plurality of operations, the plurality of operations comprising:
receiving a plurality of different types of data associated with the wind turbine or a fleet of wind turbines, the plurality of different types of data comprising, at least, reliability data, the reliability data comprising, at least, time-to-event data from the wind turbine or the fleet of wind turbines;
determining a number of failures or a number of suspensions present in the time-to-event data;
comparing the number of failures or the number of suspensions to a threshold;
generating a failure prediction model for the component based on the reliability data and available time-series measurements;
applying the failure prediction model to the plurality of different types of data associated with the wind turbine or the fleet of wind turbines based on types of data available in the received plurality of different types of data, the applied failure prediction model comprising one of a conditional survival model or a joint conditional survival model;
using the default model as the failure prediction model when the number of failures or the number of suspensions is below the threshold;
estimating, via the failure prediction model, the future risk of failure of the wind turbine; and
implementing a control action based on the future risk of failure, wherein implementing the control action comprises at least one of shutting down the industrial asset or shutting down the component of the industrial asset.

\* \* \* \* \*